Patented Mar. 15, 1949

2,464,243

UNITED STATES PATENT OFFICE 2,464,243

RECOVERY OF RIBOFLAVIN

David A. Legg, Philadelphia, Pa., and James T. Cranmer, Oaklyn, N. J., assignors to Publicker Industries Inc., a corporation of Pennsylvania No Drawing. Application June 20, 1945, Serial No. 600,650

11 Claims. (Cl. 260—211)

The present invention relates to riboflavin and it relates more particularly to a new and improved process for concentrating and recovering riboflavin.

An object of the present invention is to provide a new and improved process for concentrating and recovering riboflavin. Another object of the present invention is to provide an efficient process for recovering riboflavin from aqueous solutions or suspensions containing appreciable amounts thereof. Still another object of the present invention is to provide a process for effectively recovering the riboflavin content of bacterial fermentation mashes or residues or stillages or the like.

Other objects and advantages of the present invention are apparent in the following detailed description and appended claims.

The recovery of riboflavin from bacterial fermentation mashes or residues or stillages or from other sources wherein the riboflavin is found in appreciable, although low, concentration, presents a problem which has hitherto never been entirely satisfactorily solved.

As a result, the usual practice has been simply to concentrate these residues or stillages, etc. and to employ the concentrated, dried and ground solid residue as an animal foodstuff, etc. having appreciable riboflavin content.

While suggestions have been made in the past to recover riboflavin itself from these fermentation residues, none of them has proven entirely satisfactory since they involve relatively costly operations and accurately controlled procedure and since they do not result in an efficient concentration and recovery of the riboflavin.

Thus, for example, Keresztesy et al. 2,355,220 suggests the direct extraction of the riboflavin from the fermentation mash using butanol. This procedure, however, requires repeated extractions and does not give optimum yields and, as a result, is relatively costly and not entirely satisfactory.

Hines 2,367,644 suggests the reduction of the riboflavin to a less soluble "riboflavin precursor" which is then precipitated out, filtered off and extracted with aqueous solutions of lower aliphatic alcohols, etc. and re-oxidized to riboflavin by passing air through the solution. This procedure likewise has been found not entirely satisfactory and, moreover, is limited to solutions containing at least 20 mcg./ml. of riboflavin.

Accordingly, the present invention contemplates a new and improved process for recovering riboflavin from fermentation mashes, etc. containing riboflavin either in large concentrations or in concentrations less than 20 mcg./ml. and which gives good yields and which employs relatively inexpensive and re-usable materials and which can be carried out by simple operations.

Generally speaking, the present invention comprehends the recovery of riboflavin from fermentation mashes or the like by extracting leuco-riboflavin (which either has been reduced during the fermentation and has been preserved in the leuco form by maintenance of anaerobic conditions or has been reduced from the oxidized form after completion of the fermentation) with a selective solvent which is not completely miscible with water; the solvent containing most of the leuco-riboflavin thereafter being permitted to separate out and being removed by decantation. The solvent phase may then be concentrated and the dissolved leuco-riboflavin, after reoxidation, may then crystallize out in the form of the yellow riboflavin crystals which are recovered by filtration.

While, at present, we prefer to employ n-butyl alcohol, other substances may be used as the selective solvent for the leuco-riboflavin. In general, we have found the water immiscible primary and secondary alcohols (particularly those containing from 4 to 8 carbon atoms) work best as selective solvents for extracting leuco-riboflavin from an aqueous solution or fermentation mash or the like. We have found that an aliphatic alcohol of this type whose solubility in water is generally of the order of 6–12% gives good results. Those alcohols less soluble than 3% have been found generally less satisfactory because they tend to form emulsions more readily and thereby complicate the separation of the two phases.

Thus, in addition to n-butyl alcohol, we may employ such other water-immiscible partially or slightly water soluble primary or secondary alcohols as iso-butyl alcohol, secondary butyl alcohol, benzyl alcohol, iso-amyl alcohol and cyclohexanol, etc.

We have found that these alcohols are capable of taking up the greater part of the leuco-riboflavin from the aqueous fermentation mash, etc. on a single extraction.

Thus, for example, we have found that, upon shaking equal volumes of solvent with aqueous solutions containing leuco-riboflavin, the distribution of the leuco-riboflavin in the two phases was as set forth in Table 1.

TABLE 1

| Solvent | Per cent of leuco-riboflavin in— | |
|---|---|---|
| | solvent phase | aqueous phase |
| n-butyl alcohol | 80 | 20 |
| iso-butyl alcohol | 64 | 36 |
| secondary butyl alcohol | 63 | 37 |
| benzyl alcohol | 90 | 10 |
| iso-amyl alcohol | 56 | 44 |
| cyclohexanol | 68 | 32 |

We have found that these selective solvents work much more effectively upon leuco-riboflavin than they do upon riboflavin itself. Thus, by way of contrast, when the same procedure was applied to an aqueous solution of riboflavin, the per cent taken up in the solvent phase was much less as shown in Table 2:

TABLE 2

| Solvent | Per cent riboflavin in— | |
|---|---|---|
| | solvent phase | aqueous phase |
| n-butyl alcohol | 45 | 55 |
| iso-butyl alcohol | 26 | 74 |
| secondary butyl alcohol | 31 | 69 |
| benzyl alcohol | 75 | 25 |
| iso-amyl alcohol | 17 | 83 |

Of the solvents discussed above, n-butyl alcohol is presently preferred because it not only provides effective extraction of the leuco-riboflavin from the aqueous fermentation mash, etc., but also can readily be re-cycled for recovery and re-use in a plant in which butyl alcohol and riboflavin are being simultaneously produced.

In the case of butanol-acetone fermentations, as carried on by Clostridium acetobutylicum or other well-known organisms, large volumes of hydrogen and carbon dioxide are produced during the fermentation in addition to the solvents and the riboflavin and, inasmuch as this fermentation is usually carried out in closed tanks having gas exit pipes, the atmosphere above the mash soon becomes substantially free of oxygen so that the riboflavin remains in the form of leuco-riboflavin unless and until the mash is exposed to air.

Thus, in the case of the butanol-acetone fermentation, the riboflavin can be extracted by treating the fermented mash directly with the selective solvent in an atmosphere of oxygen-free gas or, alternatively, the fermented mash may be distilled under anaerobic conditions and the extraction may be applied to the stillage in an oxygen free atmosphere.

However, we have found that, under conditions prevailing in industrial fermentations, it is usually more feasible to extract a solution or a mash which has already been exposed to air so that the riboflavin is in its oxidized form. In this case, the riboflavin can readily be reduced to leuco-riboflavin, either before or during extraction, by the addition of any one of many well-known reducing agents, for example, sodium hydrosulfite, metallic zinc in acid solution, titanous chloride, etc.; the reduction of riboflavin to leuco-riboflavin by these reducing agents having been well-known in the art for many years.

In general, the aqueous solutions or suspensions of leuco-riboflavin are extracted with a volume of a partially soluble aliphatic alcohol equal to approximately 50 to 150% of the volume of the aqueous solution or suspension. As indicated in Table 1, above, the greater part of the leuco-riboflavin will be found in the alcohol phase after such extraction; the ratio of leuco-riboflavin in the alcohol and water phases running as high as 10 or more.

Furthermore, less than 10% of the other solids present in a fermentation mash will pass from the aqueous to the alcohol phase so that the ratio of riboflavin to other solids in the alcohol phase is approximately 10 times as great as it was in the original aqueous solution or suspension.

The following are illustrative, but not restrictive, example of the process of the present invention:

EXAMPLE 1

One hundred parts of a solution of riboflavin in N/50 acetic acid having a riboflavin content of 20 mcgs./ml. was agitated for approximately one minute with 0.03 part of sodium hydrosulfite and 100 parts of n-butyl alcohol in an atmosphere of carbon dioxide. The mixture became colorless and, upon standing for a few minutes, formed two phases which were separated by decantation. Air was passed through the two phases to re-oxidize the leuco-riboflavin to riboflavin and, upon being assayed, the butanol phase was found to contain approximately 88% of the riboflavin while the aqueous phase contained approximately 12%; the total riboflavin recovered being 99.9%. The pH of the aqueous phase was 2.78.

When this procedure was repeated without reducing the riboflavin, the butanol phase was found to contain only 46% of the riboflavin while the aqueous phase contained approximately 54%.

EXAMPLE 2

One hundred parts of a fermentation stillage estimated to have a riboflavin content of 10.6 mcgs./ml. and to contain 0.91% of solids other than riboflavin was mixed with approximately 0.02 parts of sodium hydrosulfite and 100 parts of n-butyl alcohol in an atmosphere of carbon dioxide. After shaking for one minute, the mixture was allowed to stand for several minutes whereupon it separated into an aqueous phase and an alcohol phase. Upon re-oxidation and assaying, the alcohol phase was found to contain approximately 76% of the riboflavin while the aqueous phase contained approximately 24%; the total riboflavin recovered being approximately 92.6%. The total solids in the butyl alcohol phase were 0.07 grams per 100 ml. so that the concentration of riboflavin in the solids was increased from 1164 gamma in the original material (containing 0.91% solids) to approximately 10,700 gamma in the solids extracted by the butyl alcohol.

When the above procedure was repeated without reducing the riboflavin, the butyl alcohol phase was found to contain only 37% of the riboflavin while the aqueous phase contained approximately 63%. The total riboflavin recovered was approximately 97.4%. The riboflavin concentration increased from 1164 gamma in the original material to 5500 gamma in the alcohol phase; there being a greater loss in the aqueous phase.

EXAMPLE 3

The procedure of Example 2 was repeated except that iso-amyl alcohol was used in place of n-butyl alcohol. When the riboflavin was reduced to leuco-riboflavin, the iso-amyl alcohol phase was found to contain approximately 56% of the riboflavin while the aqueous phase contained approximately 44%. When the procedure was carried out without reducing the riboflavin, the iso-amyl alcohol phase contained only approximately 17% of the riboflavin while the aqueous phase contained approximately 83%.

EXAMPLE 4

The procedure of Example 2 was carried out employing a fermentation stillage assaying 11.5 mcgs./ml. of riboflavin and having a pH of 3.70; iso-butyl alcohol being used as the selective solvent. When the riboflavin was reduced to leuco-riboflavin, the iso-butyl alcohol phase was found to contain approximately 64% of the riboflavin while the aqueous phase contained approximately 36%. When the riboflavin was not reduced, the iso-butyl alcohol phase contained only approximately 26% of the riboflavin while the aqueous phase contained approximately 74%.

EXAMPLE 5

The procedure of Example 2 was repeated using secondary butyl alcohol in place of n-butyl alcohol. When the riboflavin was reduced, the alcohol phase was found to contain approximately 63% of the total riboflavin while the aqueous phase contained approximately 37%. When the riboflavin was not reduced, the alcohol phase contained only approximately 31% while the aqueous phase contained approximately 69%.

EXAMPLE 6

The procedure of Example 2 was repeated using benzyl alcohol as the solvent in place of n-butyl alcohol. When the riboflavin was reduced, the alcohol phase was found to contain approximately 90% of the riboflavin while the aqueous phase contained approximately 10%. When the riboflavin was not reduced, the alcohol phase was found to contain approximately 75% while the aqueous phase contained approximately 25%.

EXAMPLE 7

The procedure of Example 2 was repeated using cyclohexanol as the solvent in place of n-butyl alcohol. When the riboflavin was reduced, the solvent phase was found to contain approximately 68% of the riboflavin while the aqueous phase contained approximately 32%.

EXAMPLE 8

The procedure of Example 2 was repeated using metallic zinc in acid solution as the reducing agent with generally comparable results.

EXAMPLE 9

The procedure of Example 2 was repeated using titanous chloride as the reducing agent with generally comparable results.

EXAMPLE 10

Aqueous solutions of riboflavin assaying 5 to 224 mcgs./ml. were extracted with n-butyl alcohol in the manner described in Example 1; in each case, the procedure being carried out with and without reducing the riboflavin to leuco-riboflavin. It was found that, when using sodium hydrosulfite as the reducing agent, the pH of the solution was appreciably lowered, and that, when the concentration of riboflavin exceeds approximately 90–100 mcgs./ml., it is desirable to adjust the pH before or during extraction to a point above 5.0; preferably to between 6.0 and 7.0. This can be done by adding sodium carbonate or other neutralizing agent. The results of some of these runs are set forth in Table 3. From these tests it was found that 80–85% of the leuco-riboflavin in solutions assaying up to about 220 mcgs./ml. (approaching the saturation point) was extracted by agitating with n-butyl alcohol for approximately one minute. The ratio of n-butyl alcohol to the aqueous riboflavin solution is between 0.5 and 1.5 parts by volume of alcohol to 1 part of aqueous solution. The pH of the aqueous phase may range from 2 to 5 for concentrations of leuco-riboflavin below 100 mcgs./ml. However, for concentrations above this figure, it is desirable to raise the pH to between 6 and 7.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

As used in the appended claims, the term "solution" comprehends suspensions and emulsions or the like as well as true solutions.

TABLE 3

*Influence of butyl alcohol water ratio and of concentration of riboflavin and pH on extraction*

| Riboflavin mcg./ml. | pH range of Aq. phase | Ratio BuOH Water | Riboflavin Reduced, Distribution percent in— | | Riboflavin not reduced, Distribution on percent in— | |
|---|---|---|---|---|---|---|
| | | | BuOH phase | Aqueous phase | BuOH phase | Aqueous phase |
| 4.8 | 2–5 | 1–1 | 84 | 16 | 34 | 66 |
| 10 | 2–5 | 1–1 | 77 | 23 | 38 | 62 |
| 21 | 2–5 | 1–1 | 87 | 13 | 42 | 58 |
| 41 | 2–5 | 1–1 | 79 | 21 | 47 | 53 |
| 38 | 2–5 | 1–1 | 80 | 20 | 46 | 54 |
| 38 | 2–5 | 0.75–1 | 84 | 16 | 39 | 61 |
| 38 | 2–5 | 0.5–1 | 77 | 23 | 26 | 74 |
| 60.5 | 2–5 | 1–1 | 84 | 16 | 44 | 56 |
| 78 | 2–5 | 1–1 | 87 | 13 | 47 | 53 |
| 96 | 2–5 | 1–1 | 87 | 13 | 46 | 54 |
| 125 | 2–5 | 1–1 | 53 | 47 | 49 | 51 |
| 134 | 2–5 | 1.5–1 | 40 | 60 | 60 | 40 |
| 130 | 6–7 | 1.5–1 | 75 | 25 | | |
| 178 | 2–5 | 1.5–1 | 24 | 76 | 60 | 40 |
| 180 | 6–7 | 1.5–1 | 82 | 18 | | |
| 224 | 2–5 | 1.5–1 | 15 | 85 | 59 | 41 |
| 224 | 6–7 | 1.5–1 | 64 | 36 | | |

Having thus described the invention, what we claim as new and desire to protect by Letters Patent, is:

1. A process for recovering riboflavin from an aqueous solution containing the same which comprises treating said solution with a reducing agent thereby to form leuco-riboflavin, extracting said solution with a member of the group consisting of primary and secondary unsubstituted alcohols only slightly soluble in water and containing from 4 to 8 carbon atoms thereby to transfer most of the leuco-riboflavin thereto, separating the alcohol from said aqueous solution, and re-oxidizing the leuco-riboflavin in the alcohol to riboflavin.

2. A process for recovering leuco-riboflavin from an aqueous solution containing the same which comprises extracting said solution with a member of the group consisting of primary and secondary unsubstituted alcohols only slightly soluble in water and containing from 4 to 8 carbon atoms thereby to transfer most of the leuco-riboflavin to said alcohol, separating the alcohol from said aqueous solution, and oxidizing the leuco-riboflavin in the alcohol to riboflavin.

3. A process for recovering riboflavin from an aqueous fermentation mash containing the same which comprises treating said fermentation mash with a reducing agent thereby to form leuco-riboflavin, extracting said mash with a member of the group consisting of primary and secondary unsubstituted alcohols only slightly soluble in water and containing from 4 to 8 carbon atoms thereby to transfer most of the leuco-riboflavin to said alcohol while transferring only a small part of the other solids from said mash to said alcohol, permitting the mixture to stand until it forms an alcohol phase and an aqueous phase, separating the two phases by decantation and re-oxidizing the leuco-riboflavin in the alcohol to riboflavin.

4. A process for recovering leuco-riboflavin from an aqueous fermentation mash containing the same which comprises extracting said fermentation mesh with a member of the group consisting of primary and second unsubstituted alcohols only slightly soluble in water and containing from 4 to 8 carbon atoms.

5. A process for recovering leuco-riboflavin from an aqueous fermentation mash containing the same which comprises extracting said fermentation mash with a member of the group consisting of primary and secondary unsubstituted alcohols only slightly soluble in water and containing from 4 to 8 carbon atoms, thereby to transfer most of the leuco-riboflavin to said alcohol while transferring only a small part of the other solids from said mash to said alcohol, separating the alcohol from said aqueous mash, and oxidizing the leuco-riboflavin in the alcohol to riboflavin.

6. A process for recovering riboflavin from an aqueous solution containing the same which comprises treating said solution with a reducing agent thereby to form leuco-riboflavin, extracting said solution with n-butyl alcohol thereby to transfer most of the leuco-riboflavin to said alcohol, separating the alcohol from said aqueous solution, and re-oxidizing the leuco-riboflavin in the alcohol to riboflavin.

7. A process for recovering riboflavin from an aqueous fermentation mash which comprises treating said mash with a reducing agent thereby to form leuco-riboflavin, extracting said mash with n-butyl alcohol thereby to transfer most of the leuco-riboflavin to said alcohol while transferring only a small proportion of the other solids from said fermentation mash to said alcohol, separating the alcohol from said fermentation mash, and re-oxidizing the leuco-riboflavin in the alcohol to riboflavin.

8. A process for recovering riboflavin from an aqueous solution containing the same which comprises treating said solution with a reducing agent thereby to form leuco-riboflavin, extracting said solution with benzyl alcohol thereby to transfer most of the leuco-riboflavin to said alcohol, separating the alcohol from said aqueous solution, and reoxidizing the leuco-riboflavin in the alcohol to riboflavin.

9. A process for recovering riboflavin from an aqueous solution containing the same which comprises treating said solution with a reducing agent thereby to form leuco-riboflavin, extracting said solution with cyclohexanol thereby to transfer most of the leuco-riboflavin to said alcohol, separating the alcohol from said aqueous solution, and re-oxidizing the leuco-riboflavin in the alcohol to riboflavin.

10. A process for recovering riboflavin from an aqueous solution containing the same in concentration exceeding approximately 100 mcg./ml. which comprises treating said solution with a reducing agent thereby to form leuco-riboflavin, adjusting the pH to above approximately 5, extracting said solution with a member of the group consisting of primary and secondary unsubstituted alcohols only slightly soluble in water and containing from 4 to 8 carbon atoms thereby to transfer most of the leuco-riboflavin to said alcohol, separating the alcohol from said aqueous solution, and oxidizing the leuco-riboflavin in the alcohol to riboflavin.

11. A process for recovering riboflavin from an aqueous solution containing the same in concentrations exceeding approximately 100 mcg./ml. which comprises treating said solution with a reducing agent, thereby to form leuco-riboflavin, adjusting the pH of the solution to approximately 6-7, extracting said solution with a member of the group consisting of primary and secondary unsubstituted alcohols only slightly soluble in water and containing from 4 to 8 carbon atoms thereby to transfer most of the leuco-riboflavin to said alcohol, separating the alcohol from said aqueous solution, and oxidizing the leuco-riboflavin in the alcohol to riboflavin.

DAVID A. LEGG.
JAMES T. CRANMER.

REFERENCES CITED

The following references are of record in the file of this patent:

UNITED STATES PATENTS

| Number | Name | Date |
|---|---|---|
| 2,367,644 | Hines, Jr. | Jan. 16, 1945 |
| 2,367,646 | McMillan | Jan. 16, 1945 |